United States Patent
Tan et al.

(10) Patent No.: US 7,849,877 B2
(45) Date of Patent: Dec. 14, 2010

(54) DIVERTER VALVE

(75) Inventors: Randy Tan, Camarillo, CA (US); Chad Hamilton, Fremont, CA (US); James T. Gillette, Fremont, CA (US)

(73) Assignee: Zodiac Pool Systems, Inc., Moorpark, CA (US)

( * ) Notice: Subject to any disclaimer, the term of this patent is extended or adjusted under 35 U.S.C. 154(b) by 902 days.

(21) Appl. No.: 11/681,015

(22) Filed: Mar. 1, 2007

(65) Prior Publication Data

US 2008/0210309 A1   Sep. 4, 2008

(51) Int. Cl.
*F16K 11/076*   (2006.01)
*F16K 31/60*    (2006.01)

(52) U.S. Cl. .................. 137/625.46; 251/285; 251/288

(58) Field of Classification Search .................. 137/269, 137/625.46; 251/285, 286, 288
See application file for complete search history.

(56) References Cited

U.S. PATENT DOCUMENTS

| 261,068 | A | 7/1882 | Thorey |
|---|---|---|---|
| 413,671 | A | 10/1889 | Jewell |
| 755,370 | A | 3/1904 | Kessler |
| 825,706 | A | 7/1906 | Dyblie |
| 860,672 | A | 7/1907 | Ladd |
| 1,008,097 | A | 11/1911 | Winnow |
| 1,104,918 | A | 7/1914 | Mouat |
| 1,116,584 | A | 11/1914 | Gingrich |
| 1,130,989 | A | 3/1915 | Lemon |
| 1,166,571 | A | 1/1916 | Bard |
| 1,244,552 | A | 10/1917 | Shelor |
| 1,270,722 | A | 6/1918 | Gillette |
| 1,315,741 | A | 9/1919 | Pranold |
| 1,554,470 | A | 9/1925 | Trumble |
| 1,985,192 | A | 12/1934 | O'Marra |
| 2,114,482 | A | 4/1938 | Vrtel |
| 2,137,406 | A | 11/1938 | Johnson |

(Continued)

FOREIGN PATENT DOCUMENTS

EP   00912495   10/1983

(Continued)

OTHER PUBLICATIONS

International Search Report, PCT/US2008/54996, Jul. 25, 2008, 3 pages.

(Continued)

*Primary Examiner*—John Fox
(74) *Attorney, Agent, or Firm*—Dorsey & Whitney LLP (57) ABSTRACT

A diverter valve may include a body portion and a lid portion. The lid and body portions may define a fluid chamber. The lid portion may include a first stop and a second stop. A closure member may at least partially be received within the fluid chamber. A movable member, such as a handle, may be operatively associated with closure member. The movable member may be selectively movable relative to the lid portion between the first and second stops. A stop member may be selectively positioned on the lid portion. When positioned between the first and second stops, the stop member may limit movement of the movable member to between the stop member and one of the first and second stops. The first stop, the second stop, or both, may also comprise a stop member.

21 Claims, 10 Drawing Sheets

U.S. PATENT DOCUMENTS

| | | |
|---|---|---|
| 2,145,132 A | 1/1939 | Riney et al. |
| 2,253,020 A * | 8/1941 | Daniels ................. 137/556 |
| 2,275,132 A | 3/1942 | Crosthwait |
| 2,339,101 A | 1/1944 | Parker |
| 2,345,306 A | 3/1944 | Van Der Werff |
| 2,462,348 A | 2/1949 | Batchler |
| 2,589,176 A | 3/1952 | Wheatley |
| 2,598,148 A | 5/1952 | Thrush |
| 2,662,549 A | 12/1953 | Rhinehart et al. |
| 2,708,096 A | 5/1955 | Mueller |
| 2,766,771 A | 10/1956 | Wenzel |
| 2,825,587 A | 3/1958 | Barta et al. |
| 2,829,668 A | 4/1958 | Mueller |
| 2,839,082 A | 6/1958 | Moore et al. |
| 2,889,990 A | 6/1959 | Loveland et al. |
| D190,895 S | 7/1961 | Dillon |
| 3,072,379 A | 1/1963 | Hamer |
| 3,075,547 A | 1/1963 | Scaramucci |
| 3,166,499 A | 1/1965 | Rudelick |
| 3,195,726 A | 7/1965 | Saurenman et al. |
| 3,233,865 A | 2/1966 | Panzica et al. |
| 3,365,064 A | 1/1968 | Horan, Jr. |
| 3,392,738 A | 7/1968 | Pansini |
| 3,403,700 A | 10/1968 | Meynell |
| 3,471,021 A | 10/1969 | Prizler |
| 3,476,057 A | 11/1969 | McElroy |
| 3,489,178 A | 1/1970 | Kice |
| 3,499,467 A | 3/1970 | McCord et al. |
| 3,516,440 A | 6/1970 | Whitlock et al. |
| 3,537,473 A | 11/1970 | DeZurik, Jr. |
| 3,595,270 A | 7/1971 | McNeal, Jr. |
| 3,640,310 A | 2/1972 | Erlich |
| 3,670,893 A | 6/1972 | Seid |
| 3,721,268 A | 3/1973 | Erlich et al. |
| 3,763,892 A | 10/1973 | Lipscombe |
| 3,779,269 A | 12/1973 | Gould |
| 3,834,537 A | 9/1974 | Brett |
| 3,863,675 A * | 2/1975 | Wiltshire ................ 137/625.46 |
| 3,874,413 A | 4/1975 | Valdez |
| 3,888,280 A | 6/1975 | Tartaglia |
| 3,907,688 A | 9/1975 | Close |
| 3,921,654 A | 11/1975 | Pansini |
| 3,938,553 A | 2/1976 | Ortega |
| 3,961,770 A | 6/1976 | Wrasman |
| 3,962,089 A | 6/1976 | Fulukawa |
| 3,964,514 A | 6/1976 | Manoogian et al. |
| 4,015,816 A | 4/1977 | Semon |
| 4,043,574 A | 8/1977 | Asano |
| D246,377 S | 11/1977 | Pansini |
| 4,062,777 A | 12/1977 | Tsuruta et al. |
| 4,073,471 A | 2/1978 | Lehtinen |
| 4,077,424 A | 3/1978 | Ehret et al. |
| 4,080,990 A | 3/1978 | DeBenedetti |
| 4,081,172 A | 3/1978 | Thompson |
| 4,131,142 A | 12/1978 | Barr et al. |
| 4,137,934 A | 2/1979 | Rice et al. |
| 4,169,491 A | 10/1979 | Bajka |
| 4,170,246 A | 10/1979 | Johnson |
| 4,196,749 A | 4/1980 | Wulf |
| 4,217,933 A | 8/1980 | Perry, Jr. et al. |
| 4,257,575 A | 3/1981 | Runyan |
| 4,278,109 A | 7/1981 | Ortega |
| 4,286,664 A | 9/1981 | Bolding, Jr. |
| 4,304,264 A | 12/1981 | McClintock et al. |
| 4,308,894 A | 1/1982 | Carpentier |
| 4,312,377 A | 1/1982 | Knecht |
| 4,318,424 A | 3/1982 | Bajka |
| 4,347,915 A | 9/1982 | Cooper |
| 4,355,659 A | 10/1982 | Kelchner |
| 4,387,880 A | 6/1983 | Saarisalo et al. |
| 4,398,562 A | 8/1983 | Saarem et al. |
| 4,449,863 A | 5/1984 | Ullner |
| 4,466,457 A | 8/1984 | Brane et al. |
| 4,469,131 A | 9/1984 | Traylor |
| 4,470,429 A | 9/1984 | Johnson |
| 4,481,976 A | 11/1984 | Cyphelly |
| 4,503,881 A | 3/1985 | Vecchio |
| 4,526,186 A | 7/1985 | Frentzel |
| 4,526,200 A | 7/1985 | Niskanen |
| 4,545,905 A | 10/1985 | Poe |
| 4,553,566 A | 11/1985 | Barclay et al. |
| 4,555,334 A | 11/1985 | Cohen |
| 4,564,451 A | 1/1986 | Cohen |
| 4,569,361 A | 2/1986 | Frentzel |
| 4,579,143 A | 4/1986 | Rollins et al. |
| 4,592,378 A | 6/1986 | Frentzel |
| 4,601,307 A | 7/1986 | Johnson |
| 4,635,674 A | 1/1987 | Bajka |
| 4,654,141 A | 3/1987 | Frentzel |
| 4,655,252 A | 4/1987 | Krumhansl |
| 4,662,655 A | 5/1987 | Fliervoet et al. |
| 4,669,503 A | 6/1987 | McGarrity et al. |
| 4,678,564 A | 7/1987 | Moorehead et al. |
| 4,681,139 A | 7/1987 | Falconer |
| 4,690,434 A | 9/1987 | Schmidt |
| 4,696,499 A | 9/1987 | Butler |
| 4,705,063 A | 11/1987 | Robinson |
| 4,711,272 A | 12/1987 | Wiseman |
| 4,714,551 A | 12/1987 | Bachhofer et al. |
| 4,774,977 A | 10/1988 | Cohen |
| 4,813,455 A | 3/1989 | Iqbal |
| 4,815,693 A | 3/1989 | James et al. |
| 4,818,389 A | 4/1989 | Tobias et al. |
| 4,848,724 A | 7/1989 | Pettinaroli |
| 4,869,817 A | 9/1989 | Mendoza et al. |
| 4,901,763 A | 2/1990 | Scott |
| 4,909,933 A | 3/1990 | Carter et al. |
| 4,921,598 A | 5/1990 | Desch |
| 4,964,433 A | 10/1990 | Marietta |
| 4,981,156 A * | 1/1991 | Nicklas et al. ................ 137/270 |
| 5,073,260 A | 12/1991 | Wilkendorf |
| 5,076,319 A | 12/1991 | Salley |
| 5,102,543 A | 4/1992 | Burroughs |
| 5,115,974 A | 5/1992 | Tobias et al. |
| 5,143,117 A | 9/1992 | Klein |
| 5,148,828 A | 9/1992 | Farnham |
| 5,152,321 A | 10/1992 | Drager et al. |
| D333,341 S | 2/1993 | Tobias et al. |
| 5,211,195 A | 5/1993 | Hamos |
| 5,213,468 A | 5/1993 | Sexton et al. |
| 5,226,454 A | 7/1993 | Cabalfin |
| 5,236,006 A | 8/1993 | Platusich et al. |
| 5,320,140 A | 6/1994 | Hamos |
| 5,326,075 A | 7/1994 | Goff |
| 5,329,648 A | 7/1994 | Davey |
| 5,355,906 A * | 10/1994 | Marty et al. ............ 137/625.41 |
| 5,366,021 A | 11/1994 | Coleman |
| 5,370,175 A | 12/1994 | Waterman et al. |
| 5,398,717 A * | 3/1995 | Goncze ................... 137/270 |
| 5,408,708 A | 4/1995 | Mathis |
| 5,427,141 A | 6/1995 | Ohtsubo |
| 5,433,486 A | 7/1995 | Männl et al. |
| 5,437,304 A | 8/1995 | Delcroix |
| 5,498,096 A | 3/1996 | Johnson |
| 5,505,844 A | 4/1996 | Porter |
| 5,617,815 A | 4/1997 | Spies et al. |
| 5,636,875 A | 6/1997 | Wasser |
| 5,642,756 A | 7/1997 | Lawrence et al. |
| 5,671,769 A | 9/1997 | Booth et al. |
| 5,685,577 A | 11/1997 | Vanesky |
| 5,692,536 A * | 12/1997 | Tokarz ................... 137/270 |
| 5,713,391 A | 2/1998 | Ko |
| 5,713,850 A | 2/1998 | Heilmann et al. |
| 5,725,010 A | 3/1998 | Marty et al. |

| | | | |
|---|---|---|---|
| 5,845,674 A * | 12/1998 | Clare ................... 137/454.2 | |
| 5,893,392 A | 4/1999 | Spies et al. | |
| 5,937,903 A | 8/1999 | Afshar et al. | |
| 5,944,055 A | 8/1999 | Dicky | |
| 5,988,219 A | 11/1999 | Larsen | |
| 6,019,129 A | 2/2000 | Taha | |
| 6,035,879 A | 3/2000 | Campbell et al. | |
| 6,065,783 A | 5/2000 | Chiarelli | |
| 6,076,554 A | 6/2000 | Jensen et al. | |
| 6,170,523 B1 | 1/2001 | Chang | |
| 6,173,743 B1 * | 1/2001 | Ibanez Sapina ........ 137/625.46 | |
| 6,196,266 B1 | 3/2001 | Breda | |
| 6,197,195 B1 | 3/2001 | Booth et al. | |
| 6,240,941 B1 | 6/2001 | Small et al. | |
| 6,247,489 B1 | 6/2001 | Maskell et al. | |
| 6,283,447 B1 | 9/2001 | Fleet | |
| 6,345,645 B1 | 2/2002 | Kenna et al. | |
| 6,390,128 B1 | 5/2002 | Tung | |
| 6,479,250 B1 | 11/2002 | Bartley et al. | |
| 6,497,250 B1 * | 12/2002 | Johann ................... 137/625.46 | |
| 6,568,428 B2 | 5/2003 | Pecci et al. | |
| 6,626,203 B1 | 9/2003 | Schneider | |
| 6,668,858 B1 | 12/2003 | Bazargan | |
| 6,758,242 B2 | 7/2004 | Jones et al. | |
| 6,874,759 B2 | 4/2005 | Aoshima et al. | |
| 6,959,909 B2 | 11/2005 | Bancroft et al. | |
| 7,007,717 B2 | 3/2006 | Lin | |
| 7,021,335 B2 | 4/2006 | Yang | |
| 7,255,129 B2 | 8/2007 | Lopez | |
| 7,318,448 B2 | 1/2008 | Fleischer | |
| 2002/0189692 A1 | 12/2002 | Sato et al. | |
| 2004/0045613 A1 | 3/2004 | Hinojosa et al. | |
| 2005/0167345 A1 | 8/2005 | De Wet et al. | |

FOREIGN PATENT DOCUMENTS

| | | |
|---|---|---|
| FR | 660909 | 7/1929 |
| FR | 921787 | 5/1947 |
| FR | 1329057 | 4/1962 |
| GB | 622502 | 5/1949 |
| GB | 682591 | 11/1952 |

OTHER PUBLICATIONS

Jandy 2007 Catalog, Valves and Valve Actuators, Jandy Pool Products, Inc., pp. 141-143.
Jandy 2007 Catalog, Valve and Valve Actuator Parts Jandy Pool Products, Inc., pp. 144-152.
Jandy 2008 Catalog, Valves and Valve Actuators, Jandy Pool Products, Inc., pp. 157-159.
Jandy 2008 Catalog, Valve and Valve Actuator Parts Jandy Pool Products, Inc., pp. 160-169.
Westside Wholesale, Hayward PSV 3-Way Diverter Valve with 1.5"—2" Pipe, 2 pages, http://www.westsidewholesale.com/psv-3-way-diverter-valve-with-1-5-2-pipe.html?cm_m, known at least as early as Jul. 29, 2009.
Westside Wholesale, Pentair 1.5" PVC, 3-Way Lube-Free Diverter Valve, with 2" Slip Outside, 2 pages, http://www.westsidewholesale.com/1-5-pvc-3-way-lube-free-diverter-valve-with-slip-outside, known at least as early as Jul. 29, 2009.
Grid Controls Water Flow Control Valves, 2 pages, http://www.gridcontrols.com/05-Valves.htm, known at least as early as Jul. 29, 2009.

* cited by examiner

DIVERTER VALVE

FIELD OF INVENTION

The present invention generally relates to valves, and more particularly to diverter valves.

BACKGROUND

Many devices used in the care and treatment of swimming pools provide for a high velocity jet of water to stir dirt, leaves and other foreign matter from the pool bottom and walls and into suspension for removal by the pool circulation system, or to create a low pressure zone for suction of the same from the pool bottom and walls. Since pumps are employed in the regular circulation of water from the pool through heating and/or filtering media and back to the pool again, it is desirable to use the available circulation pump for the pool treating equipment, as well as for other water circulation systems. In such event, a diverter valve with three or more fluid openings may be used to direct the pump discharge selectively through either the normal circulation system or the auxiliary pool treating systems. The diverter valve may be adapted so that one fluid opening is connected to the pump's suction or discharge line, another to the circulation system, and a third to the cleaning system delivery.

Generally, the fluid opening for the pipe connector joined to the pump piping should remain open at all times, while fluid openings for the other pipe connectors may be selectively opened or closed. Various devices exist for eliminating inadvertent closing of the opening fluidly connected to the pump while permitting the other fluid openings to be selectively opened or closed.

SUMMARY OF THE INVENTION

Devices and mechanisms for preventing undesired closing of the fluid opening connected to the pump generally work for their intended purpose. However, it may be desirable to selectively prevent the closing of other openings in the diverter. Existing mechanisms generally do not provide for such further limiting of the number of openings that may be closed in a diverter valve. Accordingly, what is needed in the art is an improved diverter valve.

One embodiment of the present invention takes the form of a diverter valve comprising a body portion, a lid portion, a closure member, a movable member and a stop member. The lid portion may be associated with the body portion to define a fluid chamber. The lid portion may include a first stop and a second stop. The closure member may be at least partially received within the fluid chamber. The movable member may be operatively associated with the closure member, and may be selectively movable relative to the lid portion between the first and second stops. The stop member may be selectively positionable on the lid portion. When the stop member is positioned between the first and second stops, movement of the movable member may be limited to between the stop member and one of the first and second stops.

Another embodiment may take the form of a movable member and lid assembly for a diverter valve comprising a lid, a movable member, and a stop member. The lid may include a first stop and a second stop. The movable member may be movable relative to the lid between the first and second stops. The stop member may be selectively positionable on the lid. When the stop member is positioned between the first and second stops, movement of the movable member may be limited to between the stop member and one of the first and second stops.

Yet another embodiment may take the form of a lid for a diverter valve comprising a lid body. The diverter valve may include a body portion. The lid body may define at least one first aperture and at least one second aperture. At least one of the at least one first aperture may be configured to receive a fastener for joining the lid to the body portion. At least one of at least one second aperture may be configured to receive a fastener for joining the lid to an actuator.

Still yet another embodiment may take the form of a diverter valve comprising a body portion, a lid portion, a closure member, at least two stop members, and a movable member. The lid portion may be associated with the body portion to define a fluid chamber. The closure member may be at least partially received within the fluid chamber. The least two stop members may be selectively positionable on the lid portion. The movable member may be operatively associated with the closure member and selectively movable relative to the lid portion between the at least two stop members.

DETAILED DESCRIPTION

Described herein are various embodiments of a diverter valve for use in a fluid conveyance system, such as a pool piping system. The diverter valve may take the form of a body portion joined to a lid portion to define a fluid chamber. Two or more pipe connectors may extend from the body portion to fluidly connect the diverter valve's fluid chamber to piping in a fluid system. A closure member may be received in the fluid chamber. A movable member, actuator, or other movable member may be connected to the closure member. The movable member, actuator or other movable member may be movable relative to the lid portion to selectively reposition the closure member in the fluid chamber to close a fluid opening in the body portion fluidly connecting a pipe connector fluid passage to the fluid chamber.

The lid portion may include stops, either permanently or removably attached to the lid portion, to limit movement of the movable member relative to the lid portion. The stops may be arranged relative to the closure member and the body portion to prevent the movable member from being moved to a position that closes certain fluid openings in the body portion. A repositionable stop member may be positioned between the stops to further limit movement of the movable member relative to the lid portion. In particular, movement of the movable member relative to the lid portion may be limited to movement between the repositionable stop member and one of the stops.

The lid portion may take the form of a lid. The lid may include a lid body defining two sets of apertures. One set of apertures may receive fasteners for joining the lid to the body portion. The other set of apertures may receive fasteners for joining an actuator to the lid. The lid body may further include hollow columns extending from an upper surface of the lid body. The apertures for joining the actuator to the lid may be located in these hollow columns.

Figure 1:
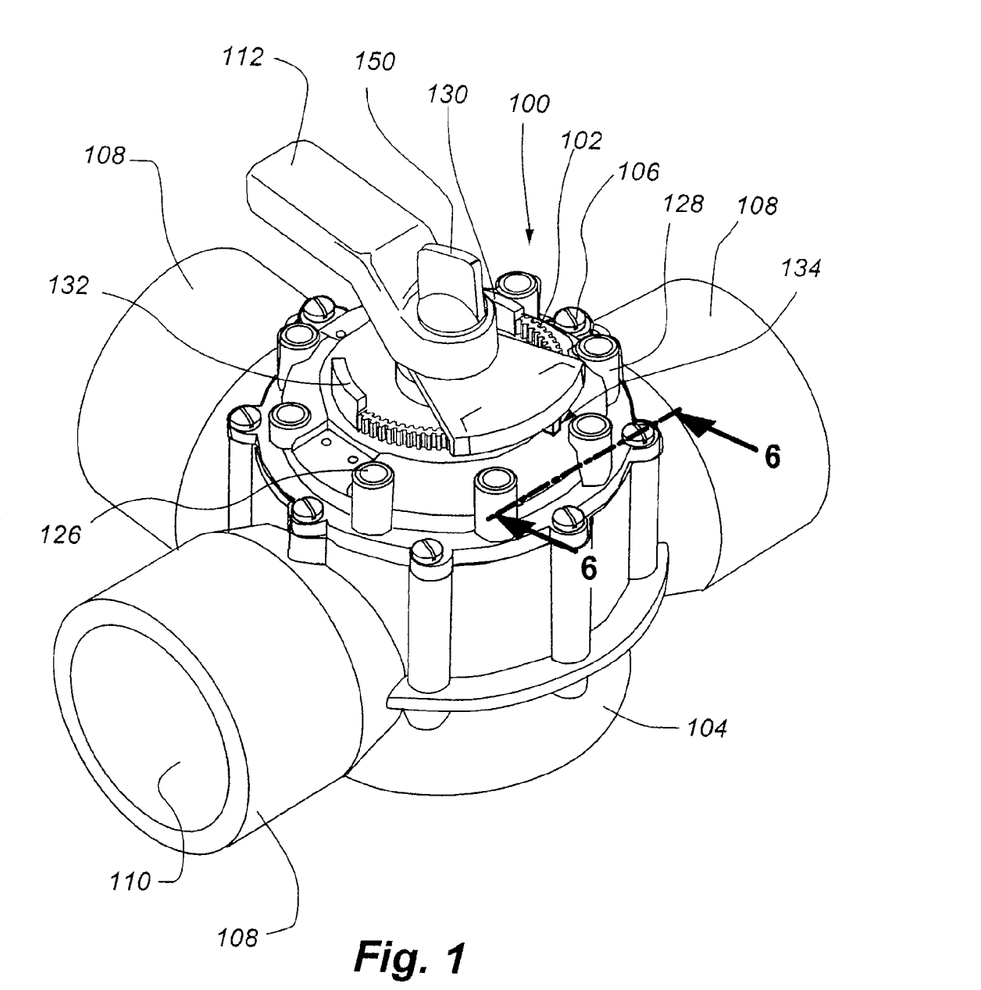
FIG. 1 is a perspective view of an embodiment of a diverter valve with a movable member, such as a handle, in a first position relative to a lid portion of the diverter valve.
Figure 2:
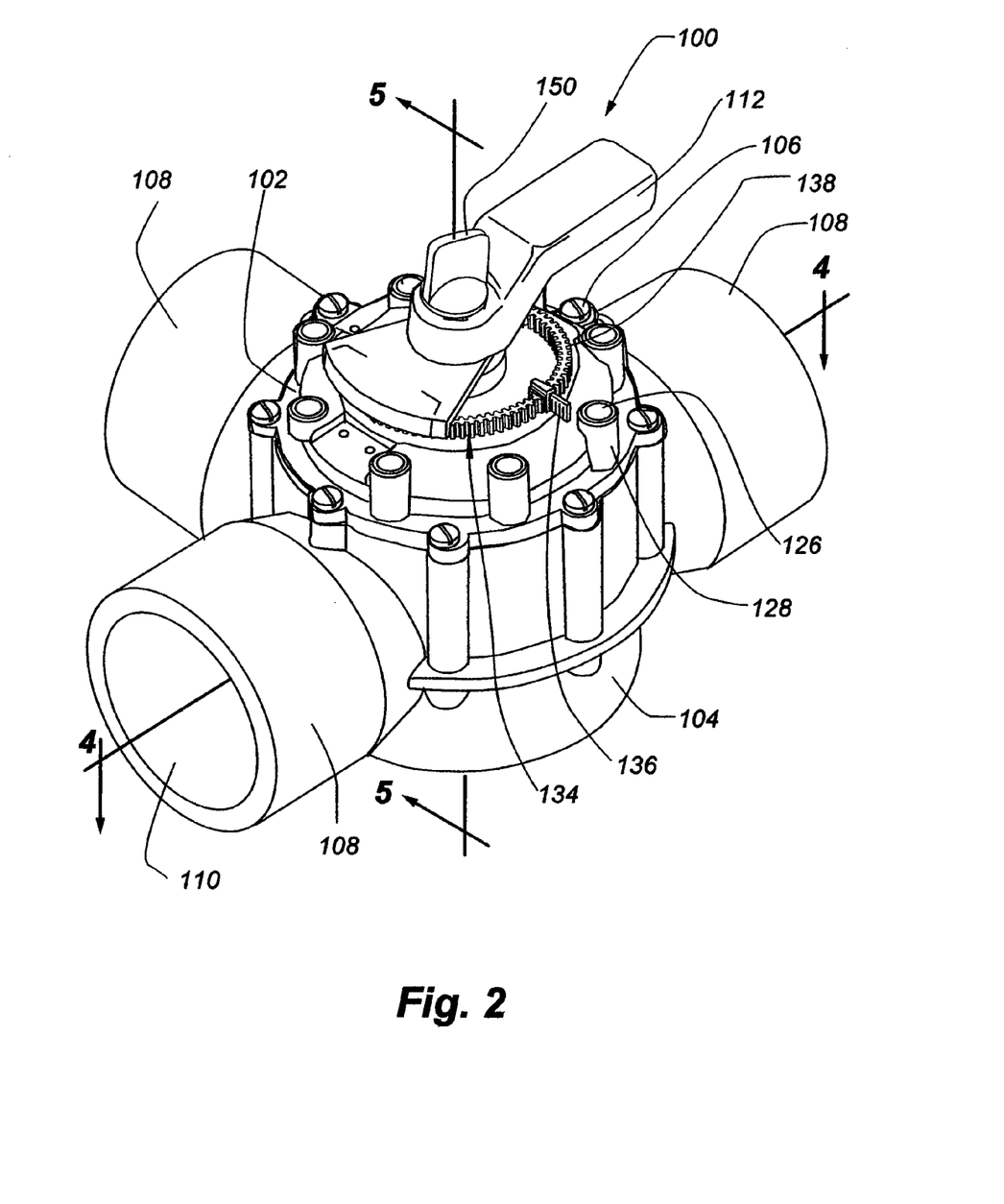
FIG. 2 is a perspective view of the diverter valve of FIG. 1 with the movable member positioned in a second position relative to the lid portion of the diverter valve.

FIGS. 1 and 2 depict an embodiment of a diverter valve 100 for use in fluid conveyance system, such as a pool piping system. With reference to FIGS. 1 and 2, the diverter valve 100 may include a generally dome shaped lid or cover portion 102 removably joined to a generally cylindrical body portion 104 by fasteners 106 received in lid and body apertures defined in the lid portion 102 and the body portion 104, respectively. The dome-shaped lid portion 102 enhances the structural strength of the lid portion 102, especially when covering a relatively large top opening in the body portion. The lid portion 102, however, may be a more planar shape or any other desired shape to cover the top opening in the body portion 104.

When joined, the lid portion 102 and the body portion 104 may define a fluid chamber for receiving and redirecting fluid in a fluid system connected to the diverter valve 100. When not joined, a user may access the interior of the diverter valve 100 for cleaning and maintaining the fluid chamber and/or the various components contained within the fluid chamber. A removable lid portion 102 may also provide interchangeability between lid and body portions 102, 104, may provide flexibility in changing which fluid passages may be selectively closed by a closure member received within the fluid chamber, and may facilitate assembly of the diverter valve 100. In some embodiments, however, the lid portion 102 may be permanently joined to the body portion 104, or the lid portion 102 and the body portion 104 may be formed as an integral piece.

Two or more cylindrical pipe connectors 108 may extend from the body portion 104. For a diverter valve used in a pool piping system, typically three pipe connectors 108 extend from the body portion 104 as shown in FIGS. 1 and 2. In other embodiments, however, more or less than three pipe connectors 108 may extend from the body portion 104. Further, although the pipe connectors 108 are depicted as being cylindrical, the pipe connectors 108 may be formed into any desired shape.

Each pipe connector 108 may define a port or an opening 110, and a fluid passage, for fluidly joining the fluid chamber to pipes or the like joined to the pipe connectors 108. Fluid communication between a pipe connector fluid passage and the fluid chamber may be selectively enabled or disabled to control which portions of a fluid system deliver or receive fluid to or from the diverter valve 100. To provide such flow control, the diverter valve 100 may further include a movable member 112, such as a handle, operatively associated with a closure member 114 (FIG. 3B) and selectively rotatable relative to the lid portion 102. Rotating the movable member 112 relative to the lid portion 102 may selectively close fluid communication between the fluid chamber 116 and a pipe connector fluid passage 118 by placing a portion of the closure member 114 between the fluid passage 118 and the fluid chamber 116 as shown in FIG. 4.

Figure 7:
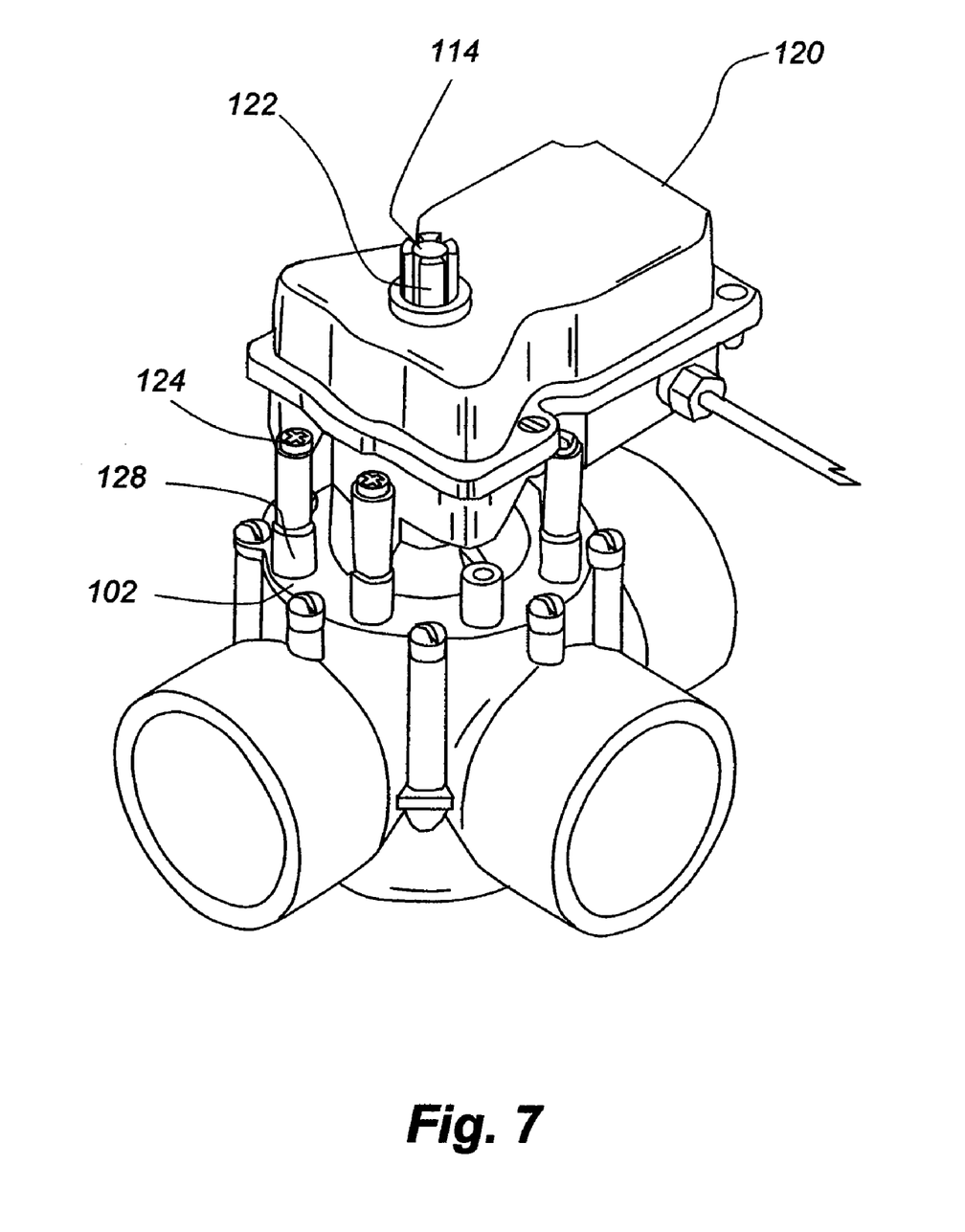
FIG. 7 is a perspective view of the diverter valve of FIG. 1 with an actuator positioned on the lid.

In some embodiments, for example, the embodiment shown in FIG. 7, the handle may be replaced with an actuator 120, which may be selectively activated to open or close fluid communication between a fluid passage 118 and the fluid chamber 116. The actuator 120 may be operatively associated with the closure member 114 via coupling to a closure member connection shaft 122 and joined to the lid portion 102 by fasteners 124 received in actuator fastener apertures 126 (see, e.g., FIG. 1) defined by cylindrical lid aperture columns 128 extending from an upper surface of the lid portion 102. The actuator fastener apertures 126 may be threaded or unthreaded depending upon the type of fastener used. For example, the actuator fastener apertures 126 may be threaded when receiving a threaded fastener, such as a threaded screw. As another example, the actuator fastener apertures 126 may be unthreaded when receiving a fastener that does not require preformed threads, such as a self tapping screw.

Returning to FIGS. 1 and 2, left and right stops 130,132 may extend from the lid portion 102 to limit the range of rotation of the movable member 112 relative to the lid portion 102. Limiting the movable member's range of rotation may prevent the movable member 112 from being moved into a position relative to the lid portion 102 that closes fluid communication between a certain fluid passage 118, or passages, and the fluid chamber 116. For example, fluid communication between the fluid chamber 116 and a fluid passage 118 fluidly connected to a pool pump should generally not be disabled because such closure may damage the pump and/or the piping connected to the pump. By selective positioning of the lid portion 102 relative body portion 104, the stops 130, 132 may be positioned relative to a fluid passage to prevent the movable member 112 from being inadvertently rotated or pivoted into a position relative to the lid portion 102 that closes fluid communication between the fluid chamber 116 and the fluid passage 118 fluidly connected to the pool pump. Each stop 130, 132 may take the form of a curved wall as shown in FIG. 1, or may take the form of any desired shape that engages the movable member 112 to limit further movement of the movable member 112 relative to the lid portion 102.

Figure 9:
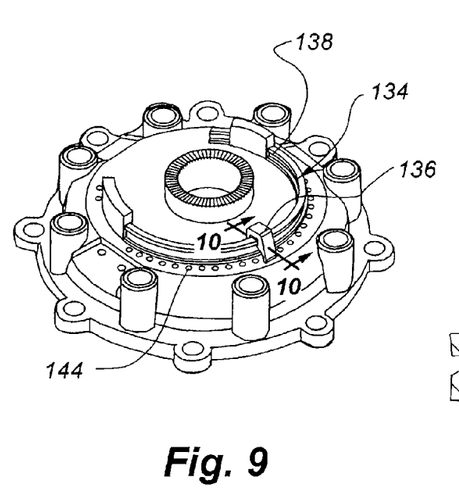
FIG. 9 is a perspective view of another alternate embodiment of the lid portion and stop member for use with a diverter valve, such as the diverter valve of FIG. 1.

Movement of the movable member 112 between the stops 130,132 may be further limited by a movable stop member assembly 134 operatively associated with the lid portion 102. The movable stop member assembly 134 may take the form of a movable or repositionable stop member 136, such as an index tab as shown in FIG. 2 or a slider as shown in FIG. 9, movably associated with the lid portion 102 by a movable member guide structure 138, such as an indexing wall as shown in FIG. 2 or a track or rail as shown in FIG. 9. The movable stop member 136 may be readily removable from the movable member guide structure 138, or may be semi-permanently or permanently joined, or otherwise associated with, the movable member guide structure 138.

As shown in FIGS. 1 and 2, the movable stop member 136 and the movable member guide structure 138 may take the form of an index tab and an indexing wall. The indexing wall, or other engagement member, as depicted in FIGS. 1 and 2, may take the form of a curved wall extending from the lid portion 102 between the stops 130, 132 and having multiple vertical splines or teeth for engaging the index tab. The index tab may be positioned at multiple locations along the indexing wall using the multiple vertical splines or teeth, thus providing for multiple positions of the index tab relative to the stops 130, 132. For example, as shown in FIG. 2, the index tab may be placed approximately half-way between the stops 130, 132. In the example shown in FIG. 2, the movable member 112 may be rotated between the right stop 132 and the index tab. The index tab, however, may be disengaged from the indexing wall, the movable member 112 rotated proximate the left stop 130, and the index member re-engaged with the indexing wall such that the movable member 112 may be rotated only between the left stop 130 and the index tab. Further, the index tab may be positioned at other locations along the indexing wall to increase or decrease the range of rotation between one of the stops 130, 132 and the index tab.

Figure 8:
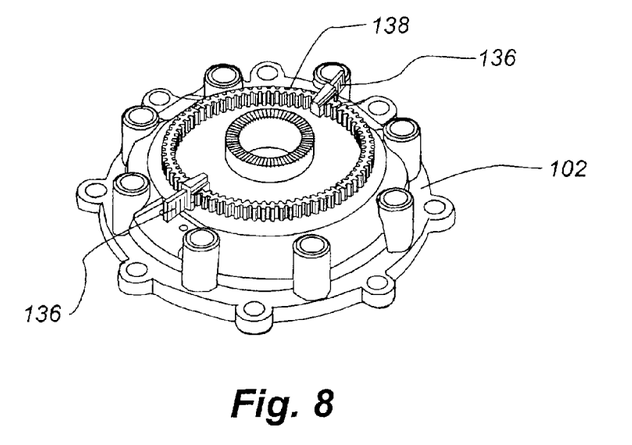
FIG. 8 is a perspective view of an alternate embodiment of the lid portion and stop members for use with a diverter valve, such as the diverter valve of FIG. 1.

The indexing wall, or other movable member guide structure 138, may partially encircle a central area of the lid portion 102 as shown in FIGS. 1 and 2, or may completely encircle a central area of the lid portion 102 as shown in FIG. 8. Further, movable stop members 136, such as index tabs, may be substituted for the left and right stops 130, 132 shown in the FIGS. 1 and 2 to provide more flexibility in setting the maximum desired rotational range for the movable member 112 relative to the lid portion 102. For example, as shown in FIG. 8, the left and right stops 130, 132 are each replaced by a movable stop member 136 to set the maximum range of rotation for the movable member 112 relative to the lid portion 102. Although both stops 130,132 are shown in FIG. 8 as replaced by a movable stop member 136, only one stop may be replaced by a movable stop member 136, if desired.

Figure 10:
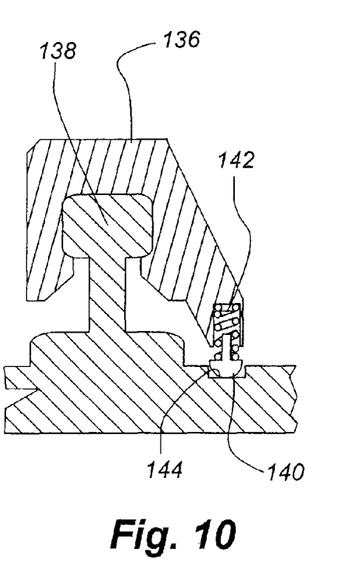
FIG. 10 is a partial cross-section view of the lid portion and stop member of FIG. 9, taken along line 10-10 in FIG. 9.

FIG. 9 depicts yet another embodiment of a movable stop member assembly 134. As shown in FIG. 9, the movable stop member 136 may take the form of a slider movably deposed on a movable member guide structure or other engagement member, such as a rail. The slider may be joined, either permanently or removably, to the rail or track. The slider may be repositioned relative to the lid portion 102 by sliding it along the rail or track. As shown in FIG. 10, the slider may include a plunger 140 biased downwardly by a spring 142 to engage detents 144 formed in the lid portion 102 to maintain the position of the slider relative to the lid portion 102 once moved into a select and desired position relative to the lid portion 102.

Returning to FIG. 1, rotation or other movement of the movable member 112 relative to the lid portion 102 may be selectively disabled by a lock fastener 150 operatively associated with the movable member 112. As discussed in more detail below, the lock fastener 150 may be selectively moved relative to movable member 112 to lock and unlock the movable member 112 to and from the lid portion 102. When locked, rotation or other movement of the movable member 112 relative to the lid portion 102 is prevented or otherwise restricted.

Figure 3A:
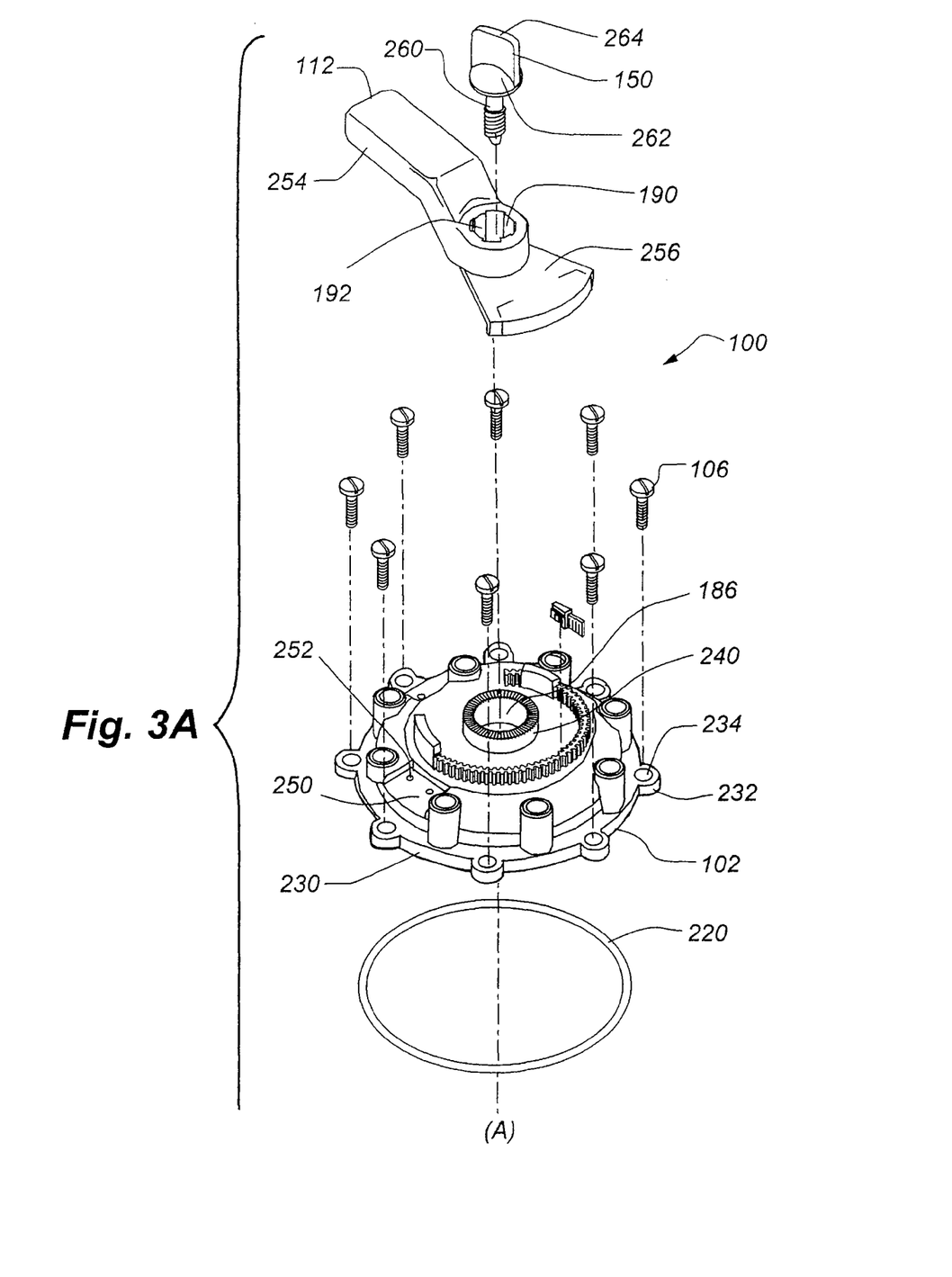
FIG. 3A is a partial exploded perspective view of the diverter valve of FIG. 1.
Figure 3B:
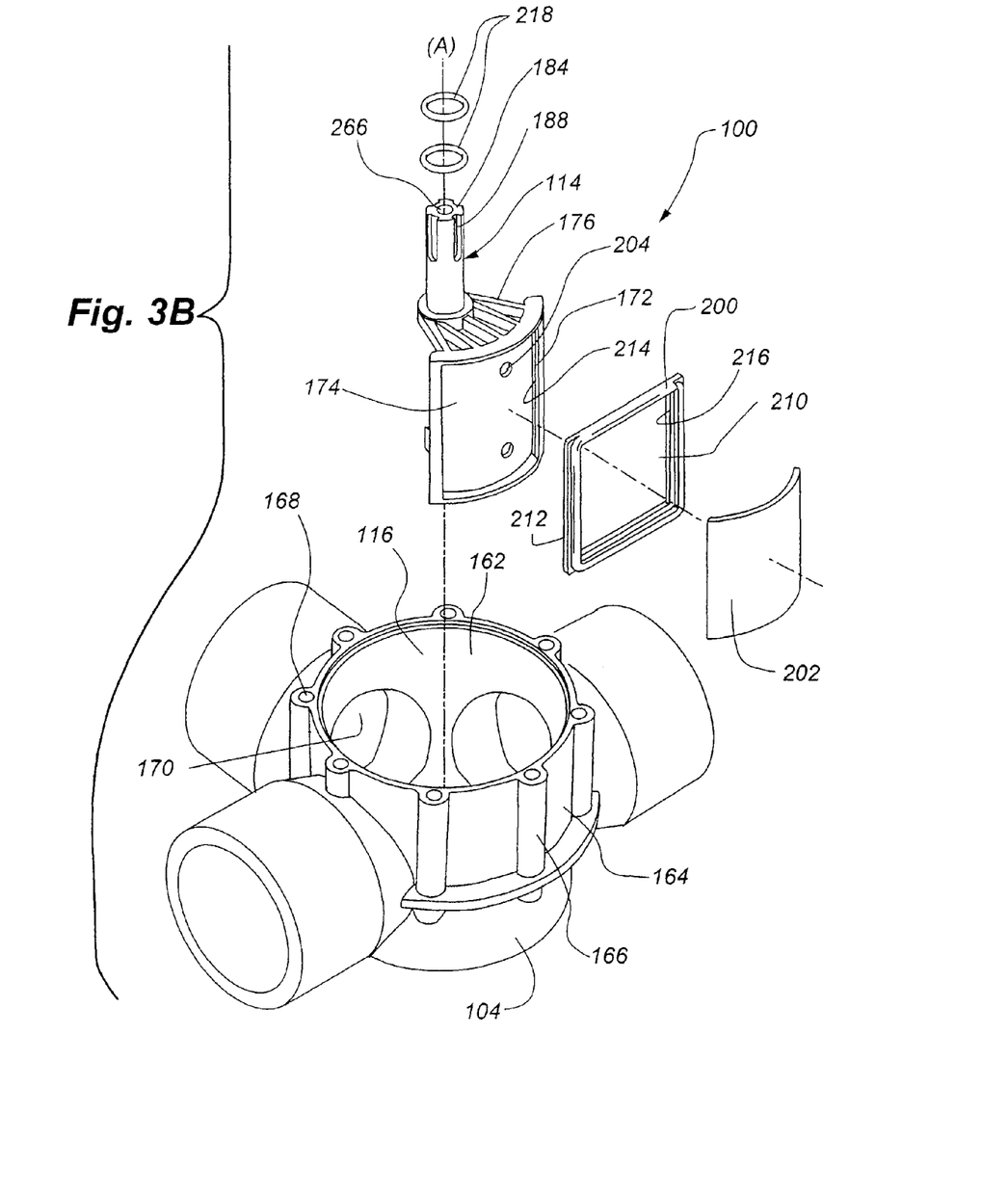
FIG. 3B is another partial exploded perspective view of the diverter valve of FIG. 1.
Figure 4:
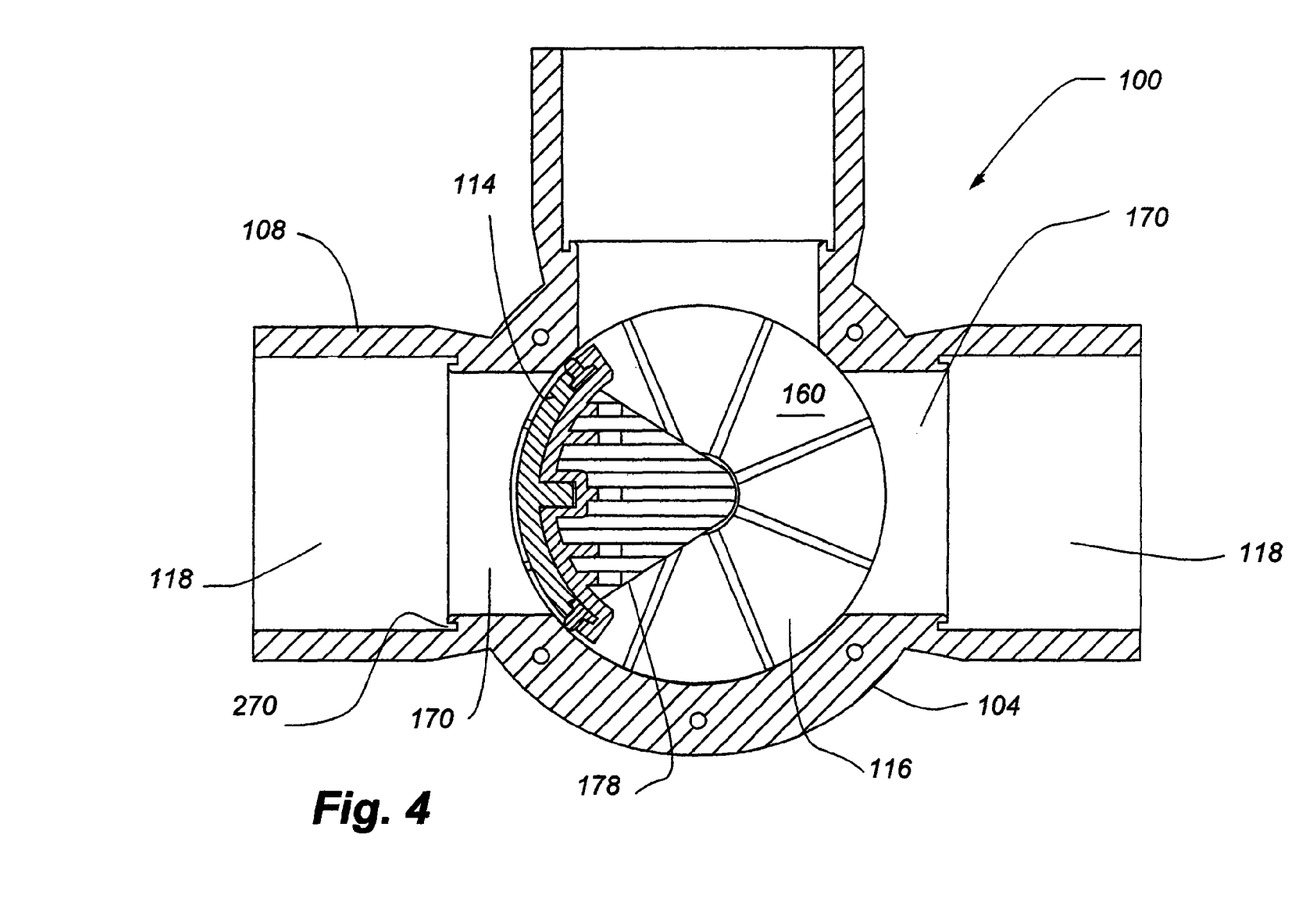
FIG. 4 is a cross-sectional view of the diverter valve of FIG. 1, taken along line 4-4 in FIG. 2.
Figure 5:
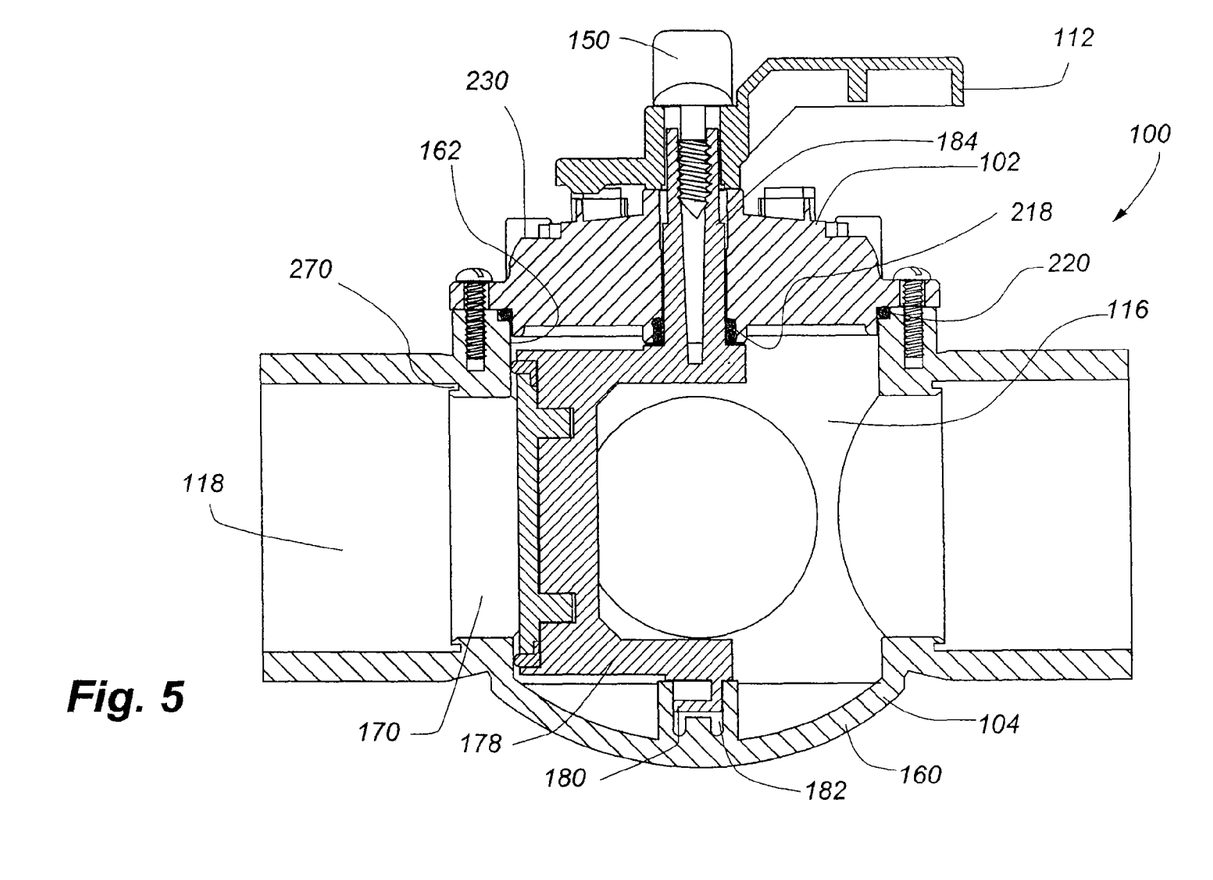
FIG. 5 is a cross-sectional view of the diverter valve of FIG. 1, taken along line 5-5 in FIG. 2.

FIGS. 3A and 3B depict an exploded view of the diverter valve 100 of FIG. 1, and FIGS. 4 and 5 depict cross-sectional views of the diverter valve 100 of FIG. 1. The body portion 104 may include a body portion bottom 160 (FIG. 4), a body portion interior surface 162, and a body portion exterior surface 164. Hollow fastener columns 166 arranged around the perimeter of the body portion 104 and extending from the body portion exterior surface 164 may define body portion apertures 168 for receiving fasteners 106 to join the body portion 104 to the lid portion 102 as described in more detail below. Eight such fastener columns 166 are shown in FIG. 3B. In other embodiments, more or less than eight fastener columns may be formed on the body portion 104. The body portion interior surface 162, the body portion bottom 160, and the lid portion 102 may define a generally cylindrical fluid chamber 116. Body portion fluid openings 170 defined in the body portion 104 and co-axially aligned with the fluid passages 118 provide fluid communication between the fluid passages 118 and the fluid chamber 116.

The closure member 114 may be movably received within the fluid chamber 116 to selectively cover, in whole or in part, one or more of the body portion fluid openings 170. Complete coverage of a body portion fluid opening 170 by the closure member 114 ends fluid communication between the associated fluid passage 118 and the fluid chamber 116. To completely cover a body portion fluid opening 170, the closure member 114 may be rotated, pivoted, or otherwise moved relative to the body portion 104 until a closure plug 172 of the closure member 114 covers the body portion fluid opening 170. Generally, the closure plug 172 may be sized to be at least slightly larger than the largest body portion fluid opening 170. Further, the closure plug outer surface 174 may be arcuate or convex shaped to match the generally curved interior surface 162 of the body portion 104.

Turning to FIGS. 3B and 5, upper and lower closure member arms 176, 178 may extend radially away from the closure plug 176. A generally cylindrical closure member bearing shaft or axle 180 may extend generally downward from the lower closure member arm 178 for receipt in a bearing hole 182 defined in the body portion bottom 160 of the body portion 104. The closure member bearing shaft 180 may be sized to be snugly, but rotatably or pivotally received within the bearing hole 182. A generally cylindrical closure member connection shaft or axle 184 may extend generally upward from the upper closure member arm 176. The closure member connection shaft 184 may extend above the lid portion 102 through a lid portion shaft opening 186. The closure member connection shaft 184 may be connected to a movable member 112, such as a handle, an actuator or other device, for rotating, pivoting or otherwise moving the closure member 114 from outside the body portion 104.

Returning to FIGS. 3A and 3B, the closure member connection shaft 184 may include connection slots 188 for receiving projections 190 extending inwardly from a movable member shaft opening 192 to join the movable member 112 to the closure member 114. This connection arrangement allows the movable member 112 to be slid or moved relative to the longitudinal axis of the closure member connection shaft 184 while also transferring rotation of the movable member 112 about the longitudinal axis of the closure member connection shaft 184 to the closure member 114. In other embodiments, the connection slots 188 may receive projections 190 formed in another structure or device, such as the actuator shown in FIG. 7.

The closure member 114 may include a valve seal 200 to prevent fluid leakage between a closed fluid passage 118 and the fluid chamber 116. The valve seal 200 may be joined to the closure plug 172 by a retainer plate 202. The retainer plate 202 may include one or more retainer plate pegs sized for receipt in closure plug holes formed in the closure plug 172. The retainer plate pegs may be retained within the closure plug holes 204 by press fit, adhesives, mechanical fasteners, heat or sonic welding, any other known joining method, or any combination thereof. The retainer plate outer surface may be arcuate or convex shaped to match the generally cylindrical interior shape of the body portion 104.

The valve seal 200 may include a valve seal body defining a valve seal opening 210. The valve opening 210 reduces the amount of material used to form the valve seal 200. The valve opening 210 also enables bending of the generally rectangular valve seal body into an arcuate or convex shape conforming to the arcuate or convex shape of the closure plug 172. Outer valve seal flanges 212 may extend outwardly from the left and right sides of the valve seal body for receipt within closure plug slots 214 formed on left and rights sides of the closure plug 172. Receipt of the outer valve seal flanges 212 within the closure plug slots 214 temporarily joins the valve seal 200 to the closure plug 172 prior to joining the retainer plate 202 to the closure plug 172. Inner valve seal flanges 216 may extend inwardly around the perimeter of the valve sealing opening 210. The inner valve seal flanges 216 are positioned between the closure plug 172 and the retainer plate 202, thus maintaining the connection of the valve seal 200 to the closure plug 172 upon joining the retainer plate 202 to the closure plug 172.

The valve seal 200 may form a water-tight seal between the closure member 114 and the body portion 104 around a closed fluid opening 170 to prevent fluid from passing moving between the closed fluid passage 118 and the fluid chamber 116 through the joint formed between the body portion 104 and the closure member 114. The valve seal 200 may be composed of rubber or other resilient, sealing material.

One or more shaft O-rings 218 may be received on the closure member connection shaft 184. As shown in FIG. 5, the shaft O-rings 218 may prevent fluid leakage from the fluid chamber 116 along the longitudinal joint formed between the closure member 114 and the lid portion 102. With reference FIGS. 3A and 5, a body portion O-ring 220 may rest on an O-ring surface formed by stepping an upper portion of the body portion interior surface 162. The body portion O-ring 218 may prevent fluid leakage from the fluid chamber 116 along the radially extending joint formed between the body portion 104 and the lid portion 102. The shaft and body portion O-rings 218, 220 may be formed from rubber, or any other resilient, sealing material.

The lid portion 102 may include a lid 230 removably attachable to the body portion 104. Winged sections 232 may extend radially outward from the perimeter of the lid 230 to define lid apertures 234 for receiving fasteners 106 to join the lid 230 to the body portion 104. Eight such lid apertures are depicted in FIG. 3A. In other embodiments, more or less than eight lid apertures may be defined by the lid. As shown in FIG. 5, the lid 230 may be placed on the body portion 104 to align the body portion apertures 168 with the lid apertures 234. Fasteners 106 received within the aligned body portion and lid apertures 168, 234 join the lid 230 to the body portion 204. Like the actuator fastener apertures 126, the body portion and lid apertures 168, 234 may be threaded or unthreaded. Further, the lid 230 may be removably or permanently joined to the body portion 104 by other joining methods, such as clamping, press fitting, heat or sonic welding, adhering, and so on.

Figure 6:
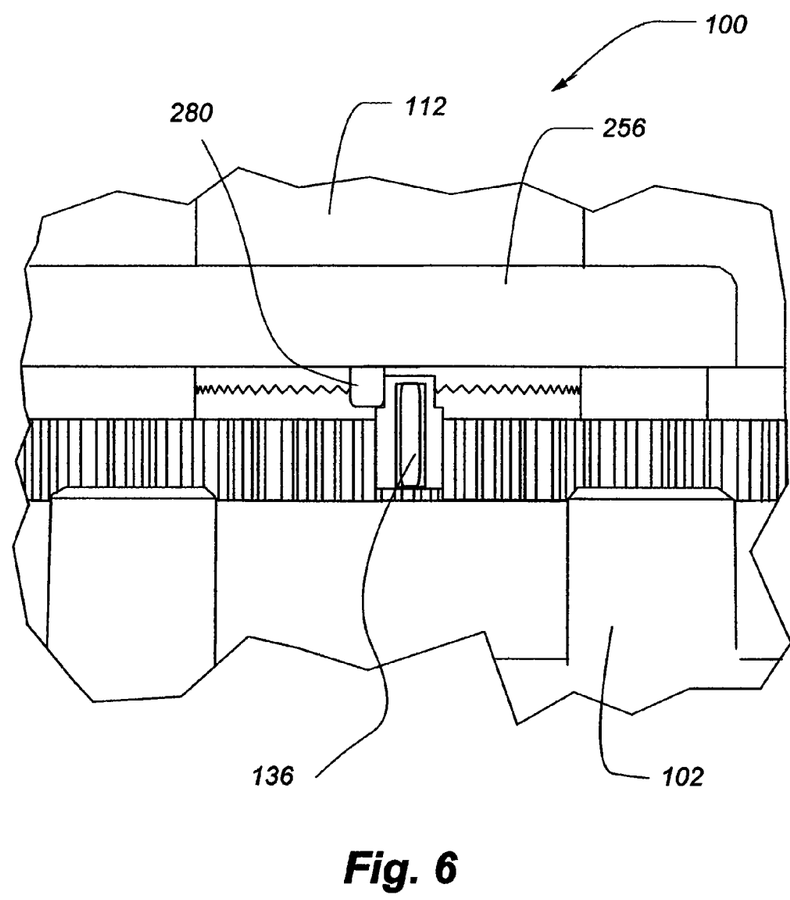
FIG. 6 is a partial elevation view of the diverter valve of FIG. 1, viewed along line 6-6 in FIG. 1.

With reference to FIGS. 3A and 6, a hollow cylindrical lid collar 240 may extend upwardly from a dome shaped lid body. The lid collar 240 may define a segment of the lid portion shaft opening 186 defined in the lid portion 102, and the dome shaped lid body may define another segment of the lid portion shaft opening 186. The lid collar 240 may include an engagement member, such as multiple lid teeth, for engagement with a corresponding engagement member, such as multiple handle teeth formed on the movable member 112. When engaged, the lid and handle teeth prevent, or otherwise resist, rotation of the movable member 112 relative to the lid portion 102. A user may selectively engage and disengage the lid and movable member teeth with aid of the lock fastener 150 as described in more detail below, thus selectively allowing and resisting movement of the movable member 112 relative to the lid portion 102.

Returning to FIG. 3A, one or more generally rectangular areas 250 of the lid body may be depressed in the outer surface for receiving removable signs (not shown). The signs may be joined to the lid body using fasteners received in sign holes 252 formed in the lid body. The signs may be printed with information regarding the diverter valve, or the piping system joined to the diverter valve, such as whether the pipe connector aligned with the depressed area is an inlet or and outlet, or whether the piping joined to the pipe connector is attached to a pump, a filter, and so on.

The movable member 112 may include a lever portion 254 and a locator portion 256 extending from the lever portion 254. The lever portion 254 may define the movable member shaft opening 192 and may include a lever extending generally upwardly from the movable member shaft opening 192 for a first segment of the lever portion 254 and then generally horizontally away from the movable member shaft opening 192 for a second segment of the lever portion 254. Slightly extending the lever upwardly before extending the lever horizontally away from the movable member shaft opening 192 provides additional space between the lid portion 102 and the movable member 112 for a user to insert the user's fingers when grasping the movable member 112.

The locator portion 256 may extend away from the movable member shaft opening 192 in a direction generally diametrically opposite the lever portion 254. The locator portion 256 may be pie shaped with an arcuate perimeter. The length of the arcuate perimeter may generally match the arcuate width of the closure plug 172, thus providing a visual indication to the user of the approximate position of the closure plug 172 within the fluid chamber 116 for certain configuration of the movable member 112 relative to the closure member 114. Specifically, when the movable member and closure member 114 are joined such that the locator portion 256 aligns over the closure plug 172, then the locator portion 256 provides a visual indication of the location of the closure plug 172 within the fluid chamber 116.

Although not shown, a keying mechanism may be employed to aid in aligning the closure plug 172 with the locator portion 256. For example, one of the connection slots 188 in the closure member 114 and the corresponding projection 190 in the movable member may be different than the other connection slots 188 and corresponding projections 190 (for example, shallower, deeper, wider, etc.) to allow the movable member 112 and closure member 114 to be joined in only one or a limited number of possible orientations. The foregoing example is merely illustrative of one method to key the movable member 112 and the closure member 114 and is not intended to limit use of other keying methods.

The lock fastener 150 may include a cylindrical and threaded lock fastener shaft 260 extending downwardly from a dome shaped lock fastener bearing portion 262, and a lock fastener grasping portion 264 extending upwardly from the lock fastener bearing portion 262. The lock fastener shaft 260 may be threaded partially along the length of the shaft 260 as shown in FIG. 3A, or may be threaded along substantially the entire length of the shaft 260. The lock fastener shaft 260 may be threadedly received within a lock fastener aperture 266 defined in the closure member connection shaft 184.

A user may use the lock fastener 150 to selectively permit and resist movement of the movable member 112 relative to the lid portion 102. More particularly, the user may tighten the lock fastener 150 against the movable member 112 to cause the movable member 112 to move downwardly towards the lid portion 102 until the movable member and lid teeth engage, thus preventing or otherwise resisting rotation or other movement of the movable member 112 relative to the lid portion 102. The user may then loosen the lock fastener 150 to allow the movable member 112 to be slid upwardly along the closure member connection shaft 184 to disengage the lid and handle teeth, thus allowing the user to rotate, pivot, or otherwise move the movable member 112 relative to the lid portion 102. After a user rotates, pivots, or moves the movable member 112 to another position relative to the lid portion 102, the user may again tighten the lock fastener 150 to prevent or otherwise resist movement of the movable member 112 relative to the lid portion 102.

Turning to FIGS. 4 and 5, one or more of the fluid passages defined by the pipe connectors 108 may be sized slightly larger than the body portion fluid openings 170, thus forming an annular interior surface or edge proximate the transition from the pipe connector fluid passage 118 to the body portion fluid opening 170. An annular recess or groove 270 may be defined within the interior surface for receiving PVC glue, or other adhesive, to join a pipe received within the pipe connector 108 to the diverter valve 100. The annular groove 270 for receiving glue may limit the adhesive from entering into the body portion fluid opening 170 when joining a pipe to the diverter valve 100.

FIG. 6 depicts a partial elevation view of the diverter valve 100 showing engagement of the movable member 112 with the movable stop member 136. The movable member 112 may include a handle stop 280 extending downwardly from the locator portion 256 of the movable member 112. The handle stop 280 may engage the movable stop member 136, thus limiting further rotation or movement of the movable member 112 relative to the lid portion 102 in a direction towards the movable stop member 136. In a similar manner, the handle stop 280 may engage one of the stops 130, 132 on the lid portion 102, thus limiting further rotation or movement of the movable member 112 relative to the lid portion 102 in a direction towards the stop.

Figure 11:
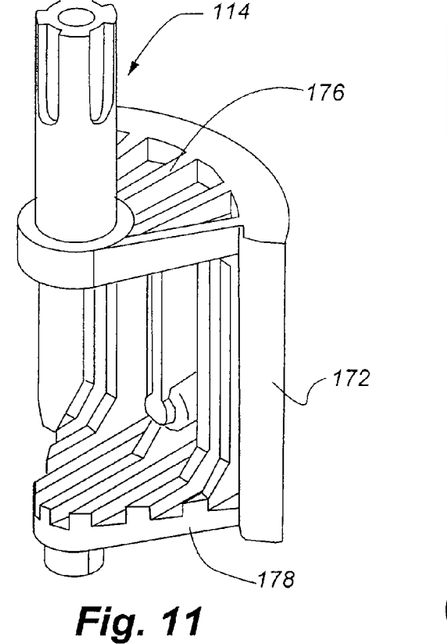
FIG. 11 is a perspective view of a closure member for a diverter valve, such as the diverter valve of FIG. 1.
Figure 12:
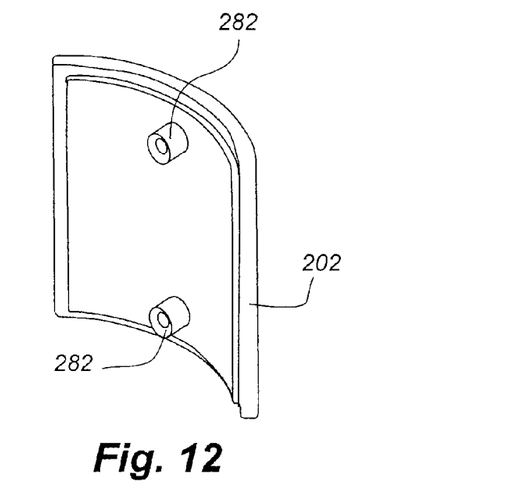
FIG. 12 is a perspective view of the retainer plate for the closure member of FIG. 11.

FIG. 11 depicts a perspective view of the closure member 114. The rear or inwardly facing surface of the closure plug 172 may be ribbed to reduce to weight and/or the amount of material used to form the closure plug 172 while maintaining the closure plug's structural strength. Similarly, the upper and lower closure member arms 176, 178 may be ribbed to reduce the weight and/or the amount of material used to form the arms 176, 178 while maintaining the structural strength of the arms 176, 178. FIG. 12 depicts a perspective view of the retainer plate 202 showing the pegs 282 for joining the retainer plate 202 to the closure plug 172.

Figure 13:
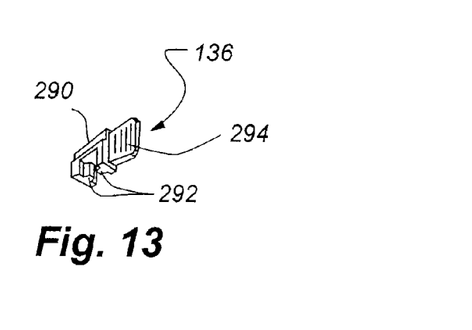
FIG. 13 is a perspective view of an embodiment of a stop member for a diverter valve, such as the diverter valve of FIG. 1.

FIG. 13 depicts a perspective view of an embodiment of the movable stop member 136. The movable stop member 136 may include a stop member connection portion 290 formed into a U or C-shape. An upper portion of the stop member connection portion 290 may step inwardly to define an upper surface for engagement with the handle stop on the movable member 112. Spline engagement members 292 may extend inwardly from the opposing sides of the U or C-shaped portion of the stop member connection portion 290 for receipt between the vertical splines or teeth on the indexing wall, thus joining the movable stop member 136 to the indexing wall. A finger or hand grasping tab 294 may extend horizontally away from the stop member connection portion 290 to provide an element for a user to hold when positioning the movable stop member 136 on the indexing wall.

Figure 14:
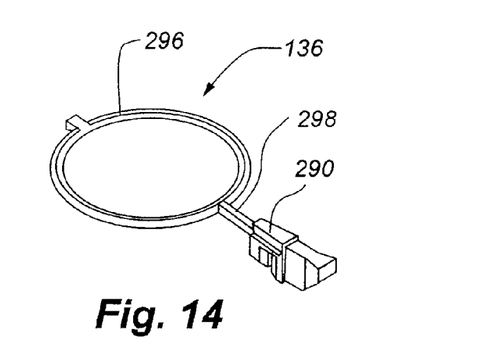
FIG. 14 is a perspective view of another embodiment of a stop member for a diverter valve, such as the diverter valve of FIG. 1.
Figure 15:
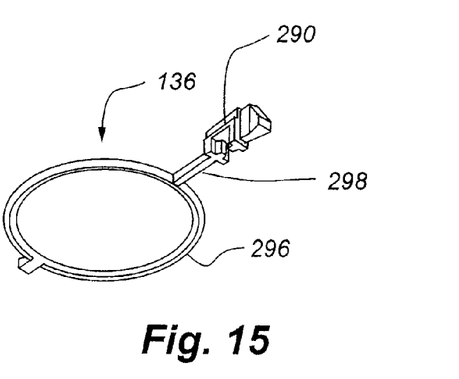
FIG. 15 is another perspective view of the stop member of FIG. 14.

FIGS. 14 and 15 depict perspective views of another embodiment of the movable stop member 136. This embodiment is similar to the embodiment depicted in FIG. 13 except the movable stop member 136 further includes a ring 296 joined to the stop member connection portion 290 by a strap or elongated member 298. The ring 296 may be received on the lid portion collar 240 to rotatably join the stop member 136 to the lid portion 102. The ring 296 allows the stop member 136 to be rotated or pivoted around the lid portion collar 240 to position in the stop member 136 at another location relative to the lid portion 102 while keeping the stop member 136 joined to the lid portion 102. Such joining of the stop member 136 to the lid portion 102 may help to keep the stop member 136, which may be a relatively small piece, from being misplaced when not joined to the indexing wall.

The components of the diverter valve described herein, including the lid portion, the body portion, movable member (e.g. a handle), the lock fastener, the fasteners, and so on, may be composed of any suitable material, including, but not limited to, plastic (e.g., PVC), metal, alloy, rubber, and so on. Any of the components may be formed from a single part, or may be formed from multiple parts joined together to create the component.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the example of the invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A diverter valve, comprising:
   a body portion;
   a lid portion associated with the body portion to define a fluid chamber, the lid portion including a first stop and a second stop;

a closure member at least partially received within the fluid chamber;

a movable member operatively associated with the closure member, the movable member selectively movable relative to the lid portion between the first and second stops;

a stop member selectively positionable on the lid portion, wherein:

positioning the stop member between the first and second stops limits movement of the movable member to between the stop member and one of the first and second stops;

the body portion defines at least two fluid openings;

the closure member selectively repositioned within the fluid chamber using the movable member to cover a first fluid opening of the at least two fluid openings; and the first and second stops prevent positioning the closure member to cover a second fluid opening of the at least two fluid openings.

2. The diverter valve of claim 1, wherein the stop member is removably associated with the lid portion.

3. The diverter valve of claim 1, wherein the movable member comprises a handle.

4. The diverter valve of claim 1, wherein the lid portion is removably associated with the body portion.

5. The diverter valve of claim 1, wherein:

the body portion defines at least one fluid opening; and the closure member may be selectively repositioned within the fluid chamber using the movable member to cover at least one of the at least one fluid opening.

6. The diverter valve of claim 1, wherein the movable member is selectively rotatable relative to the lid portion between the first and second stops.

7. The diverter valve of claim 1, wherein the movable member is selectively fixable relative to the lid portion.

8. The diverter valve of claim 1, wherein:

the movable member includes at least one engagement member;

the lid portion includes at least one corresponding engagement member selectively engageable with the at least one engagement member of the movable member; and engagement of the at least one engagement members of the lid portion and the movable member restricts movement of the movable member relative to the lid portion.

9. The diverter valve of claim 8, wherein the at least one engagement member of the movable member comprises a plurality of teeth.

10. The diverter valve of claim 8, wherein the at least one engagement member of the lid portion comprises a plurality of teeth.

11. The diverter valve of claim 1, further comprising:

at least one engagement member operably associated with the movable member;

the lid portion including at least one corresponding engagement member selectively engageable with the at least one engagement member; and the movable member, the at least one engagement member and the at least one corresponding engagement member are configured such that movement of the movable member relative to the lid portion may be selectively restricted by selective engagement of the at least one engagement member with the at least on corresponding engagement member.

12. The diverter valve of claim 11, wherein the movable member is operably associated with the at least one engagement member by integrally forming the at least one engagement member with the movable member.

13. The diverter valve of claim 1, further comprising: a lock fastener selectively engageable with the movable member, wherein the lock fastener, the lid portion, and the movable member are configured such that movement of the movable member relative to the lid portion is selectively restricted by selectively engaging the lock fastener with the movable member.

14. The diverter valve of claim 13, wherein the lock fastener comprises an engagement portion, the closure member comprises a corresponding engagement portion, and selective engagement of the engagement portion of the lock fastener with the corresponding engagement portion of the closure member selectively engages the lock fastener with the movable member.

15. The diverter valve of claim 14, wherein the engagement portion of the lock fastener comprises threads, the corresponding engagement portion of the closure member comprises threads, and the engagement portion of the lock fastener is threadedly joined to the corresponding engagement portion of the closure member to selectively engage the engagement portion of the lock fastener to the corresponding engagement portion of the closure member.

16. The diverter valve of claim 13, wherein the lock fastener is selectively engaged with the movable member by tightening the lock fastener against the movable member.

17. The diverter valve of claim 16, wherein the lock fastener comprises a grasping portion.

18. The diverter valve of claim 16, further comprising:

at least one engagement member operably associated with the movable member;

the lid portion including at least one corresponding engagement member selectively engageable with the at least one engagement member; and the movable member, the at least one engagement member and the at least one corresponding engagement member are configured such that movement of the movable member relative to the lid portion may be selectively restricted by selective engagement of the at least one engagement member with the at least on corresponding engagement member.

19. The diverter valve of claim 18, wherein the movable member is operably associated with the at least one engagement member by integrally forming the at least one engagement member with the movable member.

20. The diverter valve of claim 1, wherein the lid portion further comprises a first plurality of teeth and a second plurality of teeth, wherein the first plurality of teeth is selectively engageable with the movable member and the second plurality of teeth is operatively associated with the movable member.

21. The diverter valve of claim 20, wherein the movable member is selectively engageable with the first plurality of teeth and the stop member is selectively engageable with the second plurality of teeth.

* * * * *